(12) United States Patent
Nishimura (10) Patent No.: US 10,036,340 B2
(45) Date of Patent: Jul. 31, 2018

(54) CONTROLLER FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Naoki Nishimura, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/505,204

(22) PCT Filed: Aug. 20, 2015

(86) PCT No.: PCT/IB2015/001475
§ 371 (c)(1),
(2) Date: Feb. 20, 2017

(87) PCT Pub. No.: WO2016/027155
PCT Pub. Date: Feb. 25, 2016

(65) Prior Publication Data
US 2017/0268444 A1   Sep. 21, 2017

(30) Foreign Application Priority Data
Aug. 22, 2014   (JP) .................................. 2014-169908

(51) Int. Cl.
*F02D 41/04* (2006.01)
*F02D 41/02* (2006.01)
*F02D 41/06* (2006.01)
*F16H 63/50* (2006.01)

(52) U.S. Cl.
CPC ........ *F02D 41/0225* (2013.01); *F02D 41/042* (2013.01); *F02D 41/065* (2013.01); *F16H 63/50* (2013.01)

(58) Field of Classification Search
None
See application file for complete search history.

(56) References Cited

U.S. PATENT DOCUMENTS

| 6,494,809 B1 | 12/2002 | Suzuki et al. |
| 6,885,113 B2 * | 4/2005 | Lim ....................... B60K 6/485 290/40 A |
| 8,702,563 B1 | 4/2014 | Sangameswaran et al. |

(Continued)

FOREIGN PATENT DOCUMENTS

| CN | 103847728 A | 6/2014 |
| JP | H10-77937 A | 3/1998 |

(Continued)

*Primary Examiner* — Dirk Wright
(74) *Attorney, Agent, or Firm* — Hunton Andrews Kurth LLP (57) ABSTRACT

A controller for a vehicle, the vehicle including an engine and a transmission gear device, the controller includes an electronic control unit. The electronic control unit is configured to: (i) stop the engine automatically when predetermined engine stopping conditions are fulfilled, the predetermined engine stopping conditions including fulfillment of a shift position condition of the transmission gear device, (ii) start the engine automatically when a predetermined waiting time has elapsed since a change in shift position, and (iii) change the waiting time depending on the duration of an automatic stop of the engine.

8 Claims, 6 Drawing Sheets

(56) References Cited

U.S. PATENT DOCUMENTS

| | | | |
|---|---|---|---|
| 9,056,606 B1 * | 6/2015 | Rademacher | ......... B60W 10/06 |
| 9,850,836 B2 * | 12/2017 | Oda | ................... F02D 41/0225 |
| 2004/0046394 A1 | 3/2004 | Lim | |
| 2011/0270512 A1 | 11/2011 | Hayashi et al. | |
| 2015/0158480 A1 | 6/2015 | Rademacher et al. | |

FOREIGN PATENT DOCUMENTS

| | | |
|---|---|---|
| JP | 2000-314332 A | 11/2000 |
| JP | 2001-140673 A | 5/2001 |
| JP | 2002-372139 A | 12/2002 |
| JP | 2004-100680 A | 4/2004 |
| JP | 2007-239679 A | 9/2007 |
| JP | 2015-232289 A | 12/2015 |
| WO | 2015/132643 A1 | 9/2015 |

\* cited by examiner

CONTROLLER FOR VEHICLE AND CONTROL METHOD FOR VEHICLE

CROSS-REFERENCE TO RELATED APPLICATIONS

This is a national phase application based on the PCT International Patent Application No. PCT/IB2015/001475 filed Aug. 20, 2015, claiming priority to Japanese Patent Application No. 2014-169908 filed Aug. 22, 2014, the entire contents of both of which are incorporated herein by reference.

BACKGROUND OF THE INVENTION

1. Field of the Invention

The invention relates to a technique for setting an engine restarting condition under which an automatic stop of the engine can be suitably continued even when the shift position is changed during the automatic stop of the engine.

2. Description of Related Art

A vehicle is known in which the engine is automatically stopped to reduce fuel consumption when predetermined automatic engine stopping conditions are fulfilled and the engine is restarted when the shift position is changed to the R range during an automatic stop of the engine. In a vehicle in which the engine is restarted when the shift position is changed to the R range, when the shift position is changed from the D range to the P range with the engine automatically stopped, for example, the shift lever passes through the R range. Thus, when the shift position is changed from the D range to the P range, the automatic engine stop state is once cancelled.

Japanese Patent Application Publication No. 2004-100680 (JP 2004-100680 A) discloses a vehicle in which it is determined whether the duration of the automatic engine stop in the R range has reached a preset waiting time when the shift position is changed to the R range during an automatic stop. The vehicle of JP 2004-100680 A is equipped with a control logic that includes a step of restarting the engine if this determination is positive.

SUMMARY OF THE INVENTION

The preset waiting time that is described in JP 2004-100680 A is the period for which the automatic engine stop is not cancelled even when the shift lever passes through the R range when the shift position is changed from the D range to the P range. Thus, even a shift operation from the automatic engine stop state in the D range to the R range is required to move the vehicle, the driver must wait for the preset uniform waiting time to elapse before the engine is restarted in the R range. Thus, the action of moving the vehicle may be delayed.

The invention provides a controller for a vehicle and a control method for a vehicle that can prevent an automatic engine stop from being cancelled as the shift lever passes through the R range when the shift position is changed from the D range, in which automatic engine stop conditions are fulfilled, to the P range, and reduce the response delay in restarting the engine when the shift position is changed from the D range to the R range.

A first aspect of the invention provides a controller for a vehicle, the vehicle including an engine and a transmission gear device, the controller includes an electronic control unit. The electronic control unit is configured to: (i) stop the engine automatically when predetermined engine stopping conditions are fulfilled, the predetermined engine stopping conditions including fulfillment of a shift position condition of the transmission gear device, (ii) start the engine automatically when a predetermined waiting time has elapsed since a change in shift position, and (iii) change the waiting time depending on the duration of an automatic stop of the engine.

According to the above configuration, because the waiting time is changed depending on the duration of the automatic stop, the waiting time from a change in shift position to restart of the engine is not uniform. As a result, it is possible to prevent the action of moving the vehicle from being delayed and improve the fuel consumption efficiency and the durability of the start control system by changing the waiting time to a waiting time that allows engine start with high engine starting responsivity or to a waiting time during which restart of the engine is inhibited as appropriate.

In the controller, the electronic control unit may be configured to increase the waiting time as the duration before the change in shift position is longer. According to the above configuration, the waiting time is not uniform because it is increased as the duration of the automatic stop is longer. As a result, the waiting time increases and the automatic engine stop can be continued to inhibit restart of the engine for a longer time as the duration before a shift position change is longer, in other words, the driving condition or traveling condition is less desirable for engine restart. Thus, quick draining of the battery can be prevented and the fuel consumption efficiency and the durability of the start control system can be improved.

The transmission gear device may include a plurality of shift positions, the plurality of shift positions including a first shift position and a second shift position, the shift position condition may be fulfilled in the first shift position and the second shift position. The electronic control unit may be configured to change the waiting time when the shift position is changed to a third shift position that is located between the first shift position and the second shift position. According to the above configuration, because the length of the waiting time is changed depending on the duration of the automatic stop in the third shift position after a change in the shift position, the waiting time is not uniform. As a result, it is possible to prevent the action of moving the vehicle from being delayed and improve the fuel consumption efficiency and the durability of the start control system by changing the waiting time in the third shift position to a waiting time that allows engine start with high engine starting responsivity or to a waiting time during which restart of the engine is inhibited as appropriate.

In the controller, the first shift position may be a forward travel position, the second shift position may be a parking position, and the third shift position may be one of a neutral position and a reverse travel position. According to the above configuration, the third shift position in which the waiting time is changed is either the neutral position or the reverse travel position. As a result, it is possible to prevent the action of moving the vehicle from being delayed and improve the fuel consumption efficiency and the durability of the start control system by changing the length of the waiting time in the neutral position or the reverse travel position, through which the shift lever passes when the shift position is changed, depending on the duration of the automatic stop, to a waiting time that allows engine start with high engine starting responsivity or to a waiting time during which restart of the engine is inhibited as appropriate.

In the controller, the electronic control unit may be configured to change the waiting time when the shift position is changed to a fourth shift position that is located between the first shift position and the second shift position, and the electronic control unit may be configured to set the waiting time in the third shift position and the waiting time in the fourth shift position to different lengths. According to the above configuration, it is possible to prevent the action of moving the vehicle from being delayed and improve the fuel consumption efficiency and the durability of the start control system by changing the length of the waiting time in the fourth shift position, depending on the duration of the automatic stop, to a waiting time that allows engine start with high engine starting responsivity or to a waiting time during which restart of the engine is inhibited as appropriate.

In the controller, the first shift position may be a forward travel position, the second shift position may be a parking position, the third shift position may be one of a neutral position and a reverse travel position, and the fourth shift position may be the other of the neutral position and the reverse travel position. According to the above configuration, the fourth shift position in which the waiting time is changed is the other of the neutral position and the reverse travel position. As a result, it is possible to prevent the action of moving the vehicle from being delayed and improve the fuel consumption efficiency and the durability of the start control system by changing the length of the waiting time in the neutral position or the reverse travel position, through which the shift lever passes when the shift position is changed, depending on the duration of the automatic stop, to a waiting time that allows engine start with high engine starting responsivity or to a waiting time during which restart of the engine is inhibited as appropriate.

In the controller, the electronic control unit may be configured to set the waiting time in the reverse travel position equal to or shorter than the waiting time in the neutral position. According to the above configuration, the waiting time in the reverse travel position is set shorter than the waiting time in the neutral position. As a result, the responsivity of engine restart in the reverse travel position can be improved compared to that in the neutral position.

A second aspect of the invention provides a control method for a vehicle, the vehicle including an engine and a transmission gear device, the control method comprising: stopping the engine automatically when predetermined engine stopping conditions are fulfilled, the predetermined engine stopping conditions including fulfillment of a shift position condition of the transmission gear device, starting the engine automatically when a predetermined waiting time has elapsed since a change in shift position, and changing the waiting time depending on the duration of an automatic stop of the engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle according to one embodiment of the invention is equipped with an automatic transmission gear device that functions as a transmission gear device in a dynamic power transmission route between an engine and driving wheels. The engine is an internal combustion engine that produces dynamic power by, for example, burning fuel, such as a gasoline engine or diesel engine. The automatic transmission gear device is a planetary gear type transmission gear device, synchronous mesh-type parallel two-shaft automatic transmission gear device, DCT or the like.

This embodiment is hereinafter described in detail with reference to the drawings.

Figure 1:
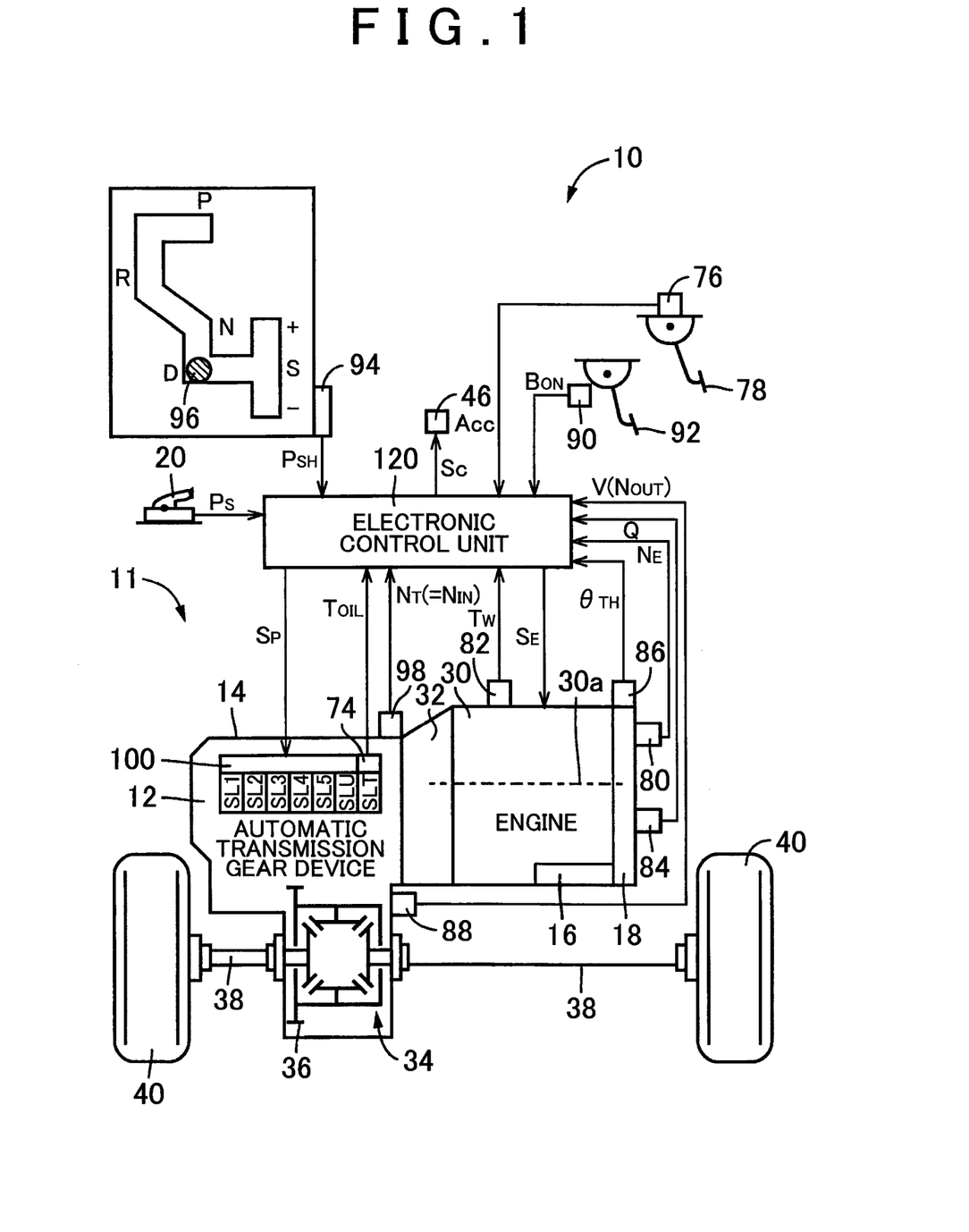
FIG. 1 is a schematic view that illustrates the configuration of a vehicle to which one embodiment of the invention is applied.

FIG. 1 is a schematic view that illustrates the general configuration of an engine 30 and an automatic transmission gear device 12 that are mounted on a vehicle 10 of this embodiment. The engine 30 is equipped with a starter 16. The starter 16 is used to start and restart the engine 30. The starter 16 is connected to a ring gear 18 that is connected to a crankshaft 30a of the engine 30. The starter 16 may be a motor generator that cranks the crankshaft 30a via a pulley or belt.

The automatic transmission gear device 12 changes the rotational speed of its input shaft and transmits dynamic power to a differential gear device 34. The input shaft corresponds to an input rotary member of the automatic transmission gear device 12. In this embodiment, the input shaft is constituted integrally with a turbine shaft of a torque converter 32 as a hydraulic power transmission that is rotatably driven by the engine 30 as a source of driving force for traveling. In this embodiment, the input shaft functions as a counter drive gear that is meshed with a counter driven gear to constitute a counter gear pair to transmit dynamic power to the differential gear device 34 that is shown in FIG. 1, for example. The counter driven gear is located coaxially with a differential drive pinion that is meshed with a differential ring gear 36 to constitute a final gear pair. In the automatic transmission gear device 12 and so on that are constituted as described above, the output of the engine 30 is transmitted sequentially via the torque converter 32, the automatic transmission gear device 12, the differential gear device 34, a pair of axles 38 and so, which are included in a vehicle power transmitting apparatus 11, to right and left driving wheels 40.

The vehicle 10 is equipped with an electronic control unit 120. The electronic control unit 120 performs hydraulic control that relates to automatic engine stop control of the automatic transmission gear device 12, for example. The electronic control unit 120 includes what is called a microcomputer that is provided with a CPU, a RAM, a ROM, an input-output interface and so on, for example. The CPU executes signal processing according to a program that is stored in advance in the ROM while using a temporary storage function of the RAM to perform output control of the engine 30, gear change control of the automatic transmission gear device 12 and so on. When necessary, the electronic control unit 120 may be divided into an engine controller for engine control, a hydraulic controller for gear change control that controls a linear solenoid valve in a hydraulic control circuit 100, and so on.

To the electronic control unit 120, signals that represent a hydraulic oil temperature $T_{OIL}$ (° C.), an accelerator operation amount $A_{CC}$ (%), an engine rotational speed $N_E$ (rpm), a coolant temperature $T_W$ (° C.), an intake air amount Q (Q/N), a throttle valve opening $\theta_{TH}$ (%), an output rotational speed $N_{OUT}$ (rpm) and so on are supplied. The hydraulic oil temperature $T_{OIL}$ (° C.) is the temperature of hydraulic oil (a known ATF, for example) in the hydraulic control circuit 100 that is detected by a hydraulic oil temperature sensor 74. The accelerator operation amount $A_{CC}$ (%) is the operation amount of an accelerator pedal 78, as the amount that is requested to the vehicle 10 by the driver (driver request amount), that is detected by an accelerator operation amount sensor 76. The engine rotational speed $N_E$ (rpm) is the rotational speed of the engine 30 that is detected by an engine rotational speed sensor 80. The coolant temperature $T_W$ (° C.) is the temperature of coolant in the engine 30 that is detected by a coolant temperature sensor 82. The intake air amount Q (Q/N) is the intake air amount into the engine 30 that is detected by an intake air amount sensor 84. The throttle valve opening $\theta_{TH}$ (%) is the opening of an electronic throttle valve that is detected by a throttle valve opening sensor 86. The output rotational speed $N_{OUT}$ (rpm) is the rotational speed of an output gear of the automatic transmission gear device 12, corresponding to the vehicle speed V (km/h), that is detected by a vehicle speed sensor 88. In addition, signals that represent an operation (ON) $B_{ON}$ of a foot brake pedal 92 that indicates the fact that a foot brake as a regular brake is in operation (depressed), a lever position (operation position, shift position) $P_{SH}$, an ON-operation $P_S$ of a parking brake 20, a turbine rotational speed $N_T$ (rpm), are supplied to the electronic control unit 120. The operation (ON) $B_{ON}$ of the foot brake pedal 92 is detected by a brake switch 90. The lever position (operation position, shift position) $P_{SH}$ is the position of a shift lever 96 that is detected by a lever position sensor 94. The turbine rotational speed $N_T$ (rpm) is the rotational speed of the turbine of the torque converter 32 that is detected by a turbine rotational speed sensor 98. The turbine rotational speed $N_T$ (rpm) is, in other words, a signal that represents an input rotational speed $N_{IN}$ which is the rotational speed of an input shaft 26.

Engine output control command signals $S_E$ for output control of the engine 30 are output from the electronic control unit 120. The output control command signals $S_E$ include, for example, a drive signal to an throttle actuator that controls the opening and closing of the electronic throttle valve depending on the accelerator operation amount $A_{CC}$, an injection signal that controls the fuel injection amount from a fuel injection device, and an ignition timing signal that controls the ignition timing of the engine 30 by an igniter. In addition, hydraulic control command signals $S_P$ for gear change control of the automatic transmission gear device 12 are output from the electronic control unit 120. The hydraulic control command signals $S_P$ include, for example, a valve command signal (hydraulic pressure command value, drive signal) that controls the excitation or non-excitation of the linear solenoid valve in the hydraulic control circuit 100 and so on to change the gear position of the automatic transmission gear device 12, and a drive signal for pressure-adjusting control of the line hydraulic pressure $P_L$.

The shift lever 96 is located in the vicinity of the driver's seat, for example. As shown in FIG. 1, the shift lever 96 is configured to be manually operated to one of five lever positions "P," "R," "N," "D" and "S."

A parking position (P position (P range)) is a position in which a neutral state where the dynamic power transmission route in the automatic transmission gear device 12 is interrupted, in other words, the transmission of dynamic power in the automatic transmission gear device 12 is interrupted, is established and in which a mechanical parking mechanism mechanically prevents (locks) rotation of the output gear of the automatic transmission gear device 12. A reverse travel position (R position) is a position in which the direction of rotation of the output gear of the automatic transmission gear device 12 is reversed. A neutral position (N position) is a position in which a neutral state where the transmission of dynamic power in the automatic transmission gear device 12 is interrupted is established. A forward travel position (D position) is a position in which all of forward gears from a first gear "1st" to a sixth gear "6th" are used in a gear change range (D range) in which gear changes of the automatic transmission gear device 12 are allowed to perform automatic gear change control. A forward travel position for manual gear change (S position) is a position in which the driver can make manual gear changes by switching a plurality of shift positions that limit the range of change of gear positions, in other words, a plurality of shift positions that are different in gear positions on the high vehicle speed side.

Auxiliary machines 46 in FIG. 1 include, for example, a pump for a power steering system, a compressor for an air conditioner, an engine oil pump, and an engine water pump. The auxiliary machines 46 are operated by command signals $S_C$ from the electronic control unit 120.

Figure 2:
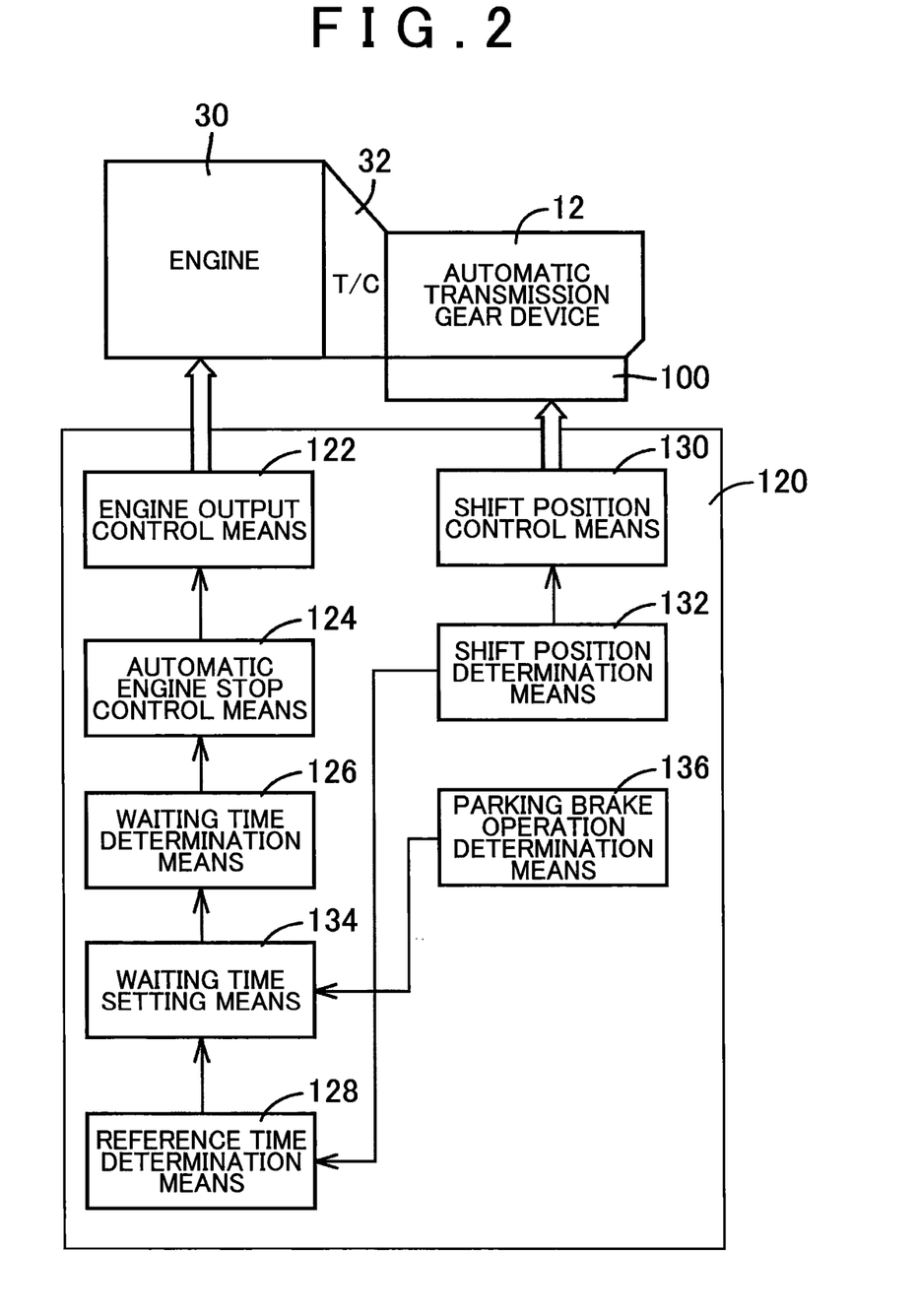
FIG. 2 is a function block diagram that illustrates an essential part of the control function of the electronic control unit in FIG. 1.

FIG. 2 is a function block diagram that illustrates an essential part of the control function of the electronic control unit 120. In FIG. 2, engine output control means 122 outputs the engine output control command signals $S_E$. The engine output control command signals $S_E$ include, for example, a signal for opening/closing control of the electronic throttle valve by a throttle actuator for throttle control, and signals for control of fuel injection amount by a fuel injection device for fuel injection amount control, and for control of an ignition device, such as the igniter, for ignition timing control. In this way, the engine output control means 122 performs opening/closing control of the electronic throttle valve with reference to the relationship (engine torque map) between the engine rotational speed $N_E$ and an estimated value $T_E{}'$ of engine torque $T_E$ (which is hereinafter referred to as "estimated engine torque) which has been experimentally obtained using the throttle valve opening $\theta_{TH}$ as a parameter and stored in advance so that a throttle valve opening $\theta_{TH}$ that can provide a target engine torque can be achieved based on the actual engine rotational speed $N_E$. The engine output control means 122 controls the fuel injection amount from the fuel injection device, and controls the ignition device, such as the igniter.

The engine output control means 122 outputs a signal that stops the engine 30 to an engine control unit for engine control of the electronic control unit 120 and so on to stop the engine 30 automatically when conditions to be fulfilled for automatic engine stop are fulfilled and it receives a command signal that performs automatic engine stop control from automatic engine stop control means 124. The conditions to be fulfilled for automatic engine stop include the fact that the shift position of the transmission gear device is in the D range or P range as a shift position condition, for example. The engine output control means 122 outputs a signal that starts the engine 30 to an engine control unit (not shown) for engine control of the electronic control unit 120 and so on to start the engine 30 automatically when it receives a command signal that cancels the automatic engine stop control from the automatic engine stop control means 124 when a predetermined waiting time has elapsed since a shift position change to the N range or the R range.

In the vehicle 10 of this embodiment, the automatic engine stop control means 124 performs automatic engine stop control to stop the operation of the engine 30 temporarily in order to reduce fuel consumption while the vehicle is traveling, for example. The automatic engine stop control means 124 outputs an engine output control command signal $S_E$ that automatically stops the engine 30 from the engine output control means 122 to the engine 30 when preset predetermined automatic engine stop control starting conditions that correspond to engine stopping conditions are fulfilled, for example. For example, the predetermined automatic engine stop control starting conditions in the D range include the fact that the vehicle speed V is lower than a predetermined vehicle speed V0, the fact that the accelerator pedal 78 is not depressed, and the fact that the foot brake pedal 92 is depressed.

The automatic engine stop control means 124 outputs an engine output control command signal $S_E$ that cancels the automatic engine stop from the engine output control means 122 to the engine 30 to start the engine 30 automatically when a preset automatic engine stop control cancelling condition is fulfilled, for example. The predetermined automatic engine stop control cancelling condition is the fact that, when a shift operation from the D range to a shift position other than the D range is made during automatic engine stop control, the duration Td of the automatic engine stop in the shift position after the shift operation has reached a predetermined waiting time, for example.

The automatic engine stop control means 124 acquires a determination result that is determined by waiting time determination means 126, for example, and commands the engine output control means 122 to output a signal that cancels the automatic engine stop control if the determination result is positive and commands the engine output control means 122 to output a signal that continues the automatic engine stop control if the determination result is negative.

When automatic engine stop control is started in the D range, for example, the waiting time determination means 126 determines whether the duration Td for which the automatic engine stop control starting conditions are fulfilled in a shift position other than the D range, i.e., one of the R range, N range and P range, that is output from shift position control means 130 has reached a waiting time that is preset by a waiting time setting means 134. Then, the waiting time determination means 126 outputs the determination result to the automatic engine stop control means 124. It should be noted that, in this embodiment, automatic stopping conditions are fulfilled within the waiting time even in the N range and R range and the automatic engine stop control is cancelled and the engine 30 is started automatically when the waiting time elapses.

The waiting time setting means 134 sets the waiting time to a first waiting time T1 if reference time determination means 128 denies that the duration Td of the automatic engine stop in the D range has reached a preset reference time Tth and sets the waiting time to a second waiting time T2 if the determination result by the reference time determination means 128 is positive, for example. It should be noted that, in this embodiment, the first waiting time T1 is set longer than the second waiting time T2 but the first waiting time T1 may be set shorter than the second waiting time T2 if automatic engine stop control is desired to be cancelled when the duration Td of an automatic engine stop in the D range is longer than the reference time Tth.

The reference time determination means 128 acquires the duration Td of the automatic engine stop in the D range that is output from the shift position control means 130 and determines whether the duration Td has reached the preset reference time Tth, for example. Then, the reference time determination means 128 outputs the determination result to the waiting time setting means 134. It should be noted that the reference time Tth is the period of time that is used to determine whether continuation of the automatic engine stop is desired by the driver, and is a predetermined value that has been determined by an experiment or the like. Preferably, the reference time Tth is 3 sec.

The shift position control means 130 outputs a hydraulic control command signal (gear change output command value) $S_P$ that engages and/or disengages a hydraulic friction device that is involved in the shift position of the automatic transmission gear device 12 to the hydraulic control circuit 100 according to a command signal that is output from shift position determination means 132, for example.

The shift position determination means 132 determines to which shift position of the automatic transmission gear device 12 ("P," "R," "N," "D" or "S") the lever position to which the shift lever 96 has been moved corresponds with reference to a signal that represents the lever position (operation position, shift position) $P_{SH}$ of the shift lever 96 and is detected by the lever position sensor 94, for example. Then, the shift position determination means 132 outputs the duration Td of the automatic engine stop control in the determined shift position to the reference time determination means 128. In addition, the shift position determination means 132 outputs a command signal that controls the automatic transmission gear device 12 to the shift position control means 130 so that the determined shift position can be achieved.

Figure 3:
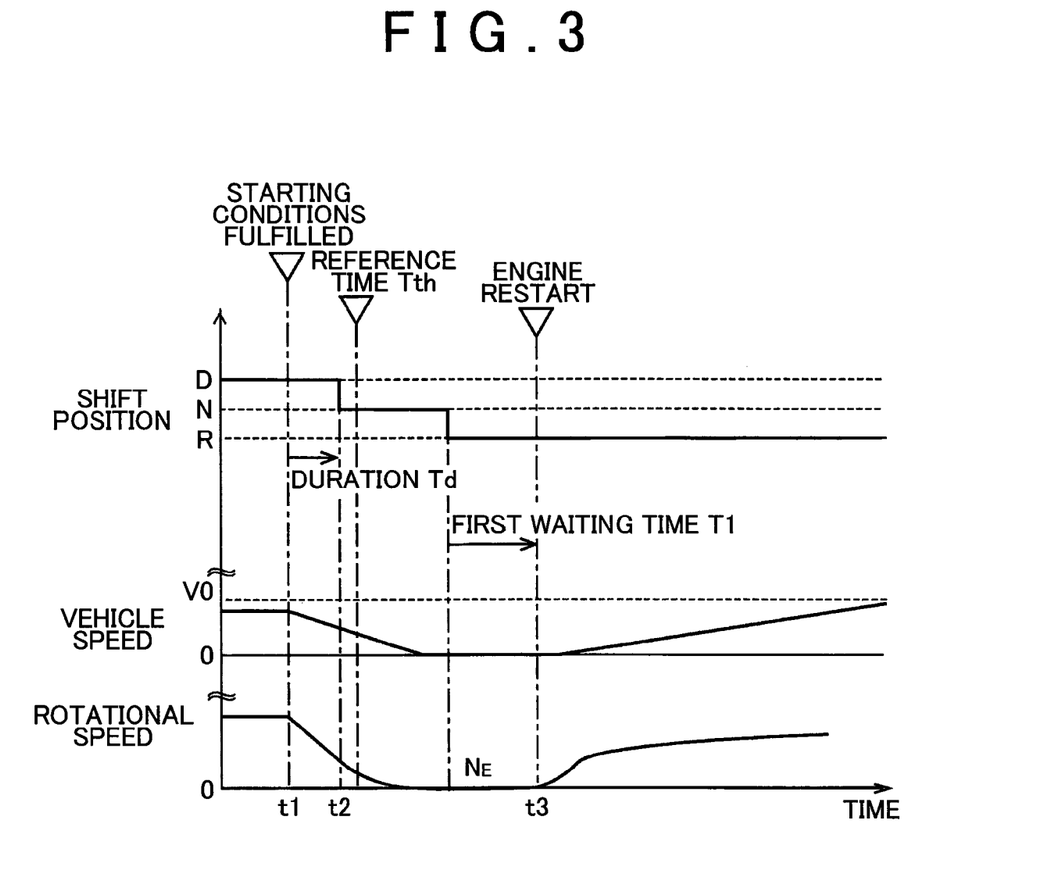
FIG. 3 is a time chart that corresponds to the control operation of the electronic control unit in FIG. 1, illustrating one example of the control operation that the controller of the vehicle performs when the duration does not exceed a reference time in this embodiment.

A time chart in FIG. 3 that corresponds to a control operation of the electronic control unit 120 in FIG. 1 in a case where the duration Td does not reach the reference time Tth is described.

In FIG. 3, when the engine output control means 122 outputs an engine output control command signal $S_E$ that automatically stops the engine 30 to the engine 30 because automatic engine stop control starting conditions are fulfilled, the engine rotational speed $N_E$ and the vehicle speed V start to decrease (at time t1). After that, the shift lever 96 is operated from the D range to the N range before the duration Td for which the automatic engine stop control starting conditions are fulfilled in the D range reaches the reference time Tth (at time t2). In this case, a predetermined waiting time as an engine restarting condition, in other words, an automatic engine stop control cancelling condition, is set as the first waiting time T1. Then, preset automatic engine stop control cancelling conditions are fulfilled when the first waiting time T1 has elapsed since the shift position change to the R range, and the engine output control means 122 outputs an engine output control command signal $S_E$ to the engine 30 to cancel the automatic engine stop. Then, the engine rotational speed $N_E$ and the vehicle speed V start to increase (at time t3).

Figure 4:
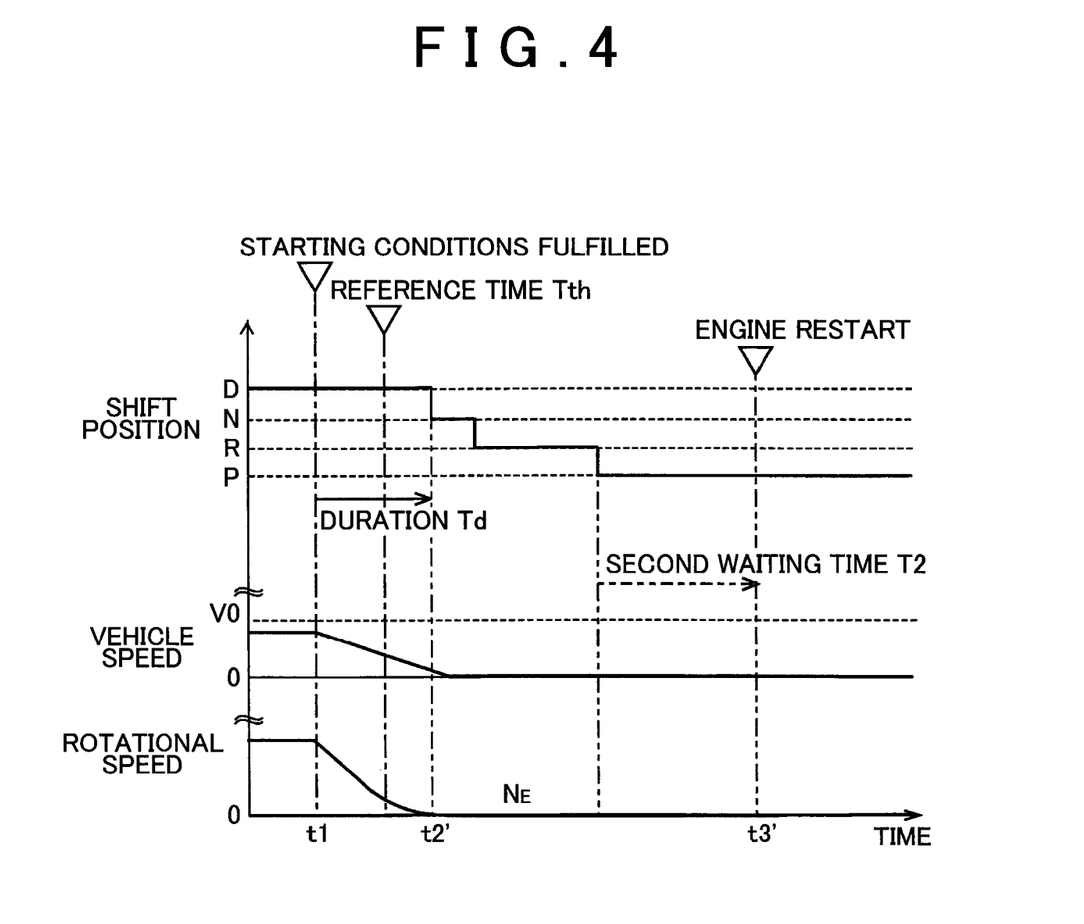
FIG. 4 is a time chart that corresponds to the control operation of the electronic control unit in FIG. 1, illustrating one example of the control operation that the controller of the vehicle performs when the duration exceeds a reference time in this embodiment.

A time chart in FIG. 4 that corresponds to a control operation of the electronic control unit 120 in FIG. 1 in a case where the duration Td reaches the reference time Tth is described.

In FIG. 4, when the engine output control means 122 outputs an engine output control command signal $S_E$ that automatically stops the engine 30 to the engine 30 because automatic engine stop control starting conditions are fulfilled, the engine rotational speed $N_E$ and the vehicle speed V start to decrease (at time t1). After that, the shift lever 96 is operated from the D range to the N range after the duration Td for which the automatic engine stop control starting conditions are fulfilled in the D range has reached the reference time Tth (at time t2'). In this case, a predetermined waiting time as an engine restarting condition, in other words, an automatic engine stop control cancelling condition, is set as the second waiting time T2. Then, the automatic engine stop control is cancelled when the second waiting time T2 has elapsed since the shift position change to the P range. It should be noted that, in this embodiment, the engine rotational speed $N_E$ and the vehicle speed V do not increase because the shift position has been changed to the P range (at time t3').

Figure 5:
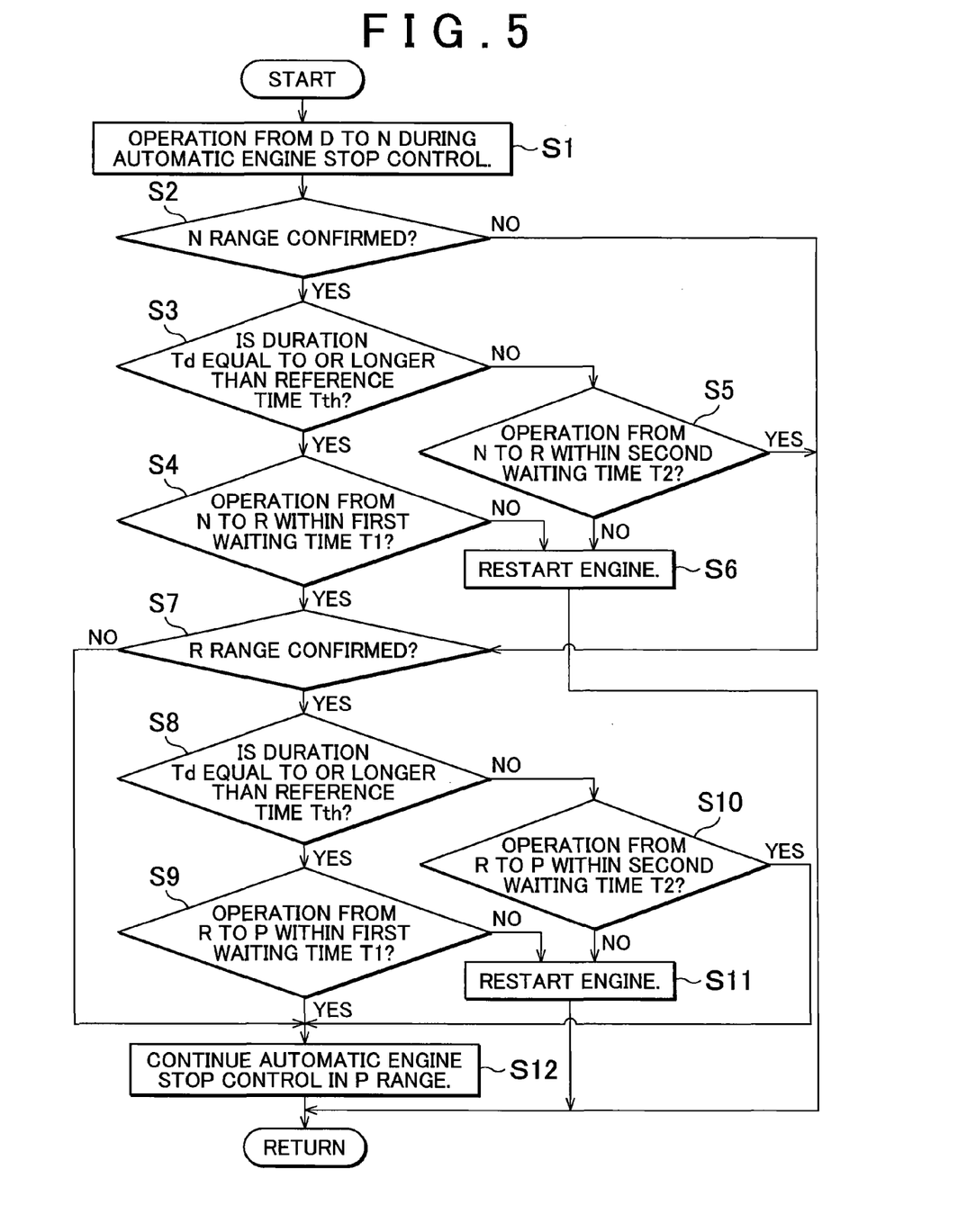
FIG. 5 is a flowchart that illustrates an essential part of the control operation of the electronic control unit in FIG. 1 in a first embodiment, i.e., the control operation that the controller of the vehicle performs after the engine has been automatically stopped.

FIG. 5 is a flowchart that illustrates the control operation of a program that is executed in the electronic control unit 120 in FIG. 1. The program is repeatedly executed with a very short cycle time of approximately several msec to several dozen msec, for example.

If a shift operation from the D range to the N range is made after automatic engine stop control is started to stop the engine automatically because predetermined automatic engine stop control starting conditions are fulfilled in the D range in step ("step" is hereinafter omitted) S1 in FIG. 5, for example, it is determined whether the shift position has been confirmed to be in the N range in S2 that corresponds to the shift position determination means 132, for example. If the determination in S2 is negative, it is determined whether the shift position has been confirmed to be in the R range in S7 that corresponds to the shift position determination means 132. If the determination in S2 is positive, it is determined whether the duration Td in the N range has reached a predetermined reference time Tth in S3 that corresponds to the reference time determination means 128, for example. If the determination in S3 is positive, a first waiting time T1 is set as the waiting time by the waiting time setting means 134. If the determination in S3 is negative, a second waiting time T2 is set as the waiting time.

If the determination in S3 is negative, it is determined whether a shift operation from the N range to the R range has been made within the predetermined second waiting time T2 since the shift operation to the N range in S5 that corresponds to the waiting time determination means 126. If the determination in S5 is positive, it is determined whether the shift position has been confirmed to be in the R range in S7 that corresponds to the shift position determination means 132. If the determination in S5 is negative, in other words, a shift operation from the N range to the R range was not made within the second waiting time T2, a signal that cancels the automatic engine stop control is output from the automatic engine stop control means 124 to the engine output control means 122, and an engine output control command signal $S_E$ that automatically starts the engine 30 is output from the engine output control means 122 to the engine 30 to restart the engine 30 in S6 that corresponds to the automatic engine stop control means 124.

If the determination in S3 is positive, it is determined whether a shift operation from the N range to the R range has been made within a predetermined first waiting time T1 since the shift operation to the N range in S4 that corresponds to the waiting time determination means 126. If the determination in S4 is negative, in other words, a shift operation from the N range to the R range was not made within the first waiting time T1, a signal that cancels the automatic engine stop control is output from the automatic engine stop control means 124 to the engine output control means 122, and an engine output control command signal $S_E$ that automatically starts the engine 30 is output from the engine output control means 122 to the engine 30 to starts the engine 30 automatically in S6 that corresponds to the automatic engine stop control means 124.

If the determination in S4 is positive, it is determined whether the shift position has been confirmed to be in the R range in S7 that corresponds to the shift position determination means 132. If the determination in S7 is negative, the automatic engine stop control is continued in the P range to continue the automatic stop of the engine 30 in S12 that corresponds to the automatic engine stop control means 124. If the determination in S7 is positive, it is determined whether the duration Td in the R range has reached a predetermined reference time Tth in S8 that corresponds to the reference time determination means 128. If the determination in S8 is positive, a first waiting time T1 is set as the waiting time by the waiting time setting means 134. If the determination in S8 is negative, a second waiting time T2 is set as the waiting time.

If the determination in S8 is negative, it is determined whether a shift operation from the R range to the P range has been made within the predetermined second waiting time T2 in S10 that corresponds to the waiting time determination means 126. If the determination in S10 is negative, in other words, a shift operation from the R range to the P range was not made within the second waiting time T2, a signal that cancels the automatic engine stop control is output to the engine output control means 122, and an engine output control command signal $S_E$ that automatically starts the engine 30 is output from the engine output control means 122 to the engine 30 to start the engine 30 automatically in S11 that corresponds to the automatic engine stop control means 124.

On the other hand, if the determination in S8 is positive, it is determined whether a shift operation from the R range to the P range has been made within the predetermined first waiting time T1 in S9 that corresponds to the waiting time determination means 126. If the determination in S9 is negative, in other words, a shift operation from the R range to the P range was not made within the first waiting time T1, a signal that cancels the automatic engine stop control is output to the engine output control means 122, and an engine output control command signal $S_E$ that automatically starts the engine 30 is output from the engine output control means 122 to the engine 30 to start the engine 30 automatically in S11 that corresponds to the automatic engine stop control means 124. If the determinations in S9 and S10 are positive, the automatic engine stop control in the P range is continued in S12 that corresponds to the automatic engine stop control means 124.

It should be noted that, in this embodiment, the first waiting time T1 is set longer than the second waiting time T2, and is preferably 500 msec. The second waiting time T2 is preferably 100 msec.

As described above, according to this embodiment, because the first waiting time T1 is changed to the second waiting time T2 depending on the duration Td of an automatic stop, the waiting time from a change in shift position to restart of the engine 30 is not uniform. As a result, the controller for a vehicle according to the invention can prevent the action of moving the vehicle 10 from being delayed and improve the fuel consumption efficiency and the durability of the start control system by changing the waiting time to the second waiting time T2 that allows engine start with high engine starting responsivity or to the first waiting time T1 during which restart of the engine is inhibited as appropriate.

In addition, according to this embodiment, because the length of the second waiting time T2 is changed depending on the duration Td of an automatic stop of the engine 30 in either the N range or R range as a third shift position or fourth shift position after a shift position change, the waiting time is not uniform. As a result, it is possible to prevent the action of moving the vehicle 10 from being delayed and improve the fuel consumption efficiency and the durability of the start control system by changing the waiting time in the N range or R range to the first waiting time T1 that allows engine start with high engine starting responsivity or to the second waiting time T2 during which restart of the engine is inhibited as appropriate.

In addition, according to this embodiment, when a shift operation to the R range is made to move the vehicle backward immediately after the vehicle is moved forward with the D range in order to parallel park the vehicle, for example, it is highly possible that the duration Td after the automatic stop of the engine 30 in the R range will be shorter than the reference time Tth. In such a case, the engine 30 can be quickly restarted when a second waiting time T2 that provides a short waiting time is set as an engine restarting condition. When the vehicle 10 is stopped and the engine 30 is automatically stopped on a road crowded with vehicles during a traffic congestion, for example, it is highly possible that the duration Td after the automatic stop of the engine 30 in the D range will be equal to or longer than the reference time Tth because the driver checks the traffic flow before making a shift operation from the D range to the P range after the vehicle 10 is stopped. In such a case, when a first waiting time T1 that provides a long waiting time is set as a condition for restarting the engine 30, restart of the engine 30 in the N range or R range can be prevented even when a shift operation from the D range to the P range is made.

While the waiting times T1 and T2 in the N range and the waiting times T1 and T2 in the R range are respectively set to the same length by the waiting time setting means 134 in the above embodiment, the waiting times T1 and T2 in the N range and the waiting times T1 and T2 in the R range may not be respectively set to the same length.

Thus, in this embodiment, the waiting times T1 and T2 in the N range and the waiting times T1 and T2 in the R range are respectively set to different lengths in contrast to the above embodiment. It should be noted that description of the matters that are not different from those in the flowchart in FIG. 5 is omitted in this embodiment.

Figure 6:
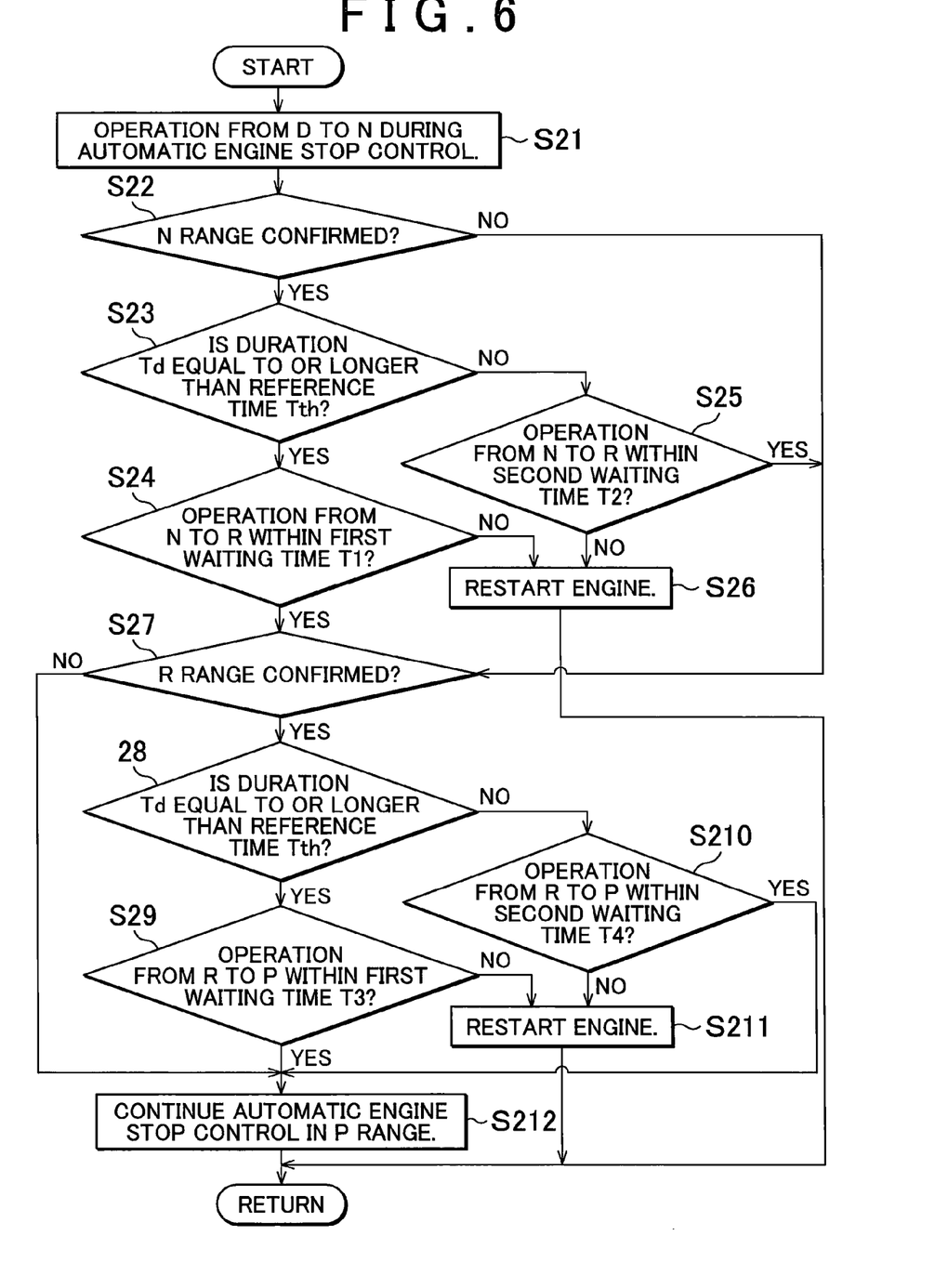
FIG. 6 is a flowchart that illustrates an essential part of the control operation of the electronic control unit in FIG. 1 in a second embodiment, i.e., the control operation that the controller of the vehicle performs after the engine has been automatically stopped.

More specifically, FIG. 6 is a flowchart that illustrates an essential part of the control operation of the electronic control unit 120 in this embodiment. The flowchart is different from the flowchart in FIG. 5 in that the waiting times T1 and T2 in the N range and the waiting times T1 and T2 in the R range are respectively different in length. For example, in FIG. 6, it is determined whether the duration Td in the R range has reached a predetermined reference time Tth in S28 that corresponds to the reference time determination means 128. If the determination in S28 is positive, a first waiting time T3 is set as the waiting time by the waiting time setting means 134. If the determination in S28 is negative, a second waiting time T4 is set as the waiting time.

In S29 that corresponds to the waiting time determination means 126, it is determined whether the shift lever 96 has been operated from the N range to the R range within the first waiting time T3, which is set shorter than the first waiting time T1. If the determination in S9 is negative, in other words, a shift operation from the R range to the P range was not made within the first waiting time T3, a signal that cancels the automatic engine stop control is output to the engine output control means 122, and an engine output control command signal $S_E$ that automatically starts the engine 30 is output from the engine output control means 122 to the engine 30 to start the engine 30 automatically in S211 that corresponds to the automatic engine stop control means 124. If the determination in S29 is positive, the automatic engine stop control in the P range is continued in S212 that corresponds to the automatic engine stop control means 124.

In S210 that corresponds to the waiting time determination means 126, it is determined whether the shift lever 96 has been operated from the N range to the R range within a second waiting time T4, which is set shorter than the second waiting time T2. If the determination in S210 is negative, in other words, a shift operation from the R range to the P range was not made within the second waiting time T2, a signal that cancels the automatic engine stop control is output to the engine output control means 122, and an engine output control command signal $S_E$ that automatically starts the engine 30 is output from the engine output control means 122 to the engine 30 to start the engine 30 automatically in S211 that corresponds to the automatic engine stop control means 124. If the determination in S210 is positive, the automatic engine stop control in the P range is continued in S212 that corresponds to the automatic engine stop control means 124.

It should be noted that, in this embodiment, the first waiting time T3 is set shorter than the first waiting time T1, and is preferably 400 msec. The second waiting time T4 is set shorter than the second waiting time T2, and is preferably 32 msec.

As described above, according to this embodiment, the first waiting time T3 is set shorter than the first waiting time T1 and the second waiting time T4 is set shorter than the second waiting time T2. Thus, the waiting times T3 and T4 in the R range are set shorter than the waiting times T1 and T2 in the N range, respectively. As a result, the responsivity of engine restart in the R range, in which a high responsivity of the starting action is required than in the N range, can be improved.

While embodiments of the invention have been described in detail in the foregoing based on the drawings, the invention is also applicable to other aspects.

In addition, while two waiting times, the first waiting time and second waiting time, are set in the above embodiments, the second waiting time may not be a fix value. For example, the waiting time may be set longer as the duration Td of an automatic stop in the D range is longer. In this case, the waiting time is not uniform. As a result, the waiting time increases and the automatic engine stop can be continued to inhibit restart of the engine for a longer time as the duration Td before a shift position change is longer, in other words, the driving condition or traveling condition is less desirable for engine restart. Thus, quick draining of the battery can be prevented and the fuel consumption efficiency and the durability of the start control system can be improved.

While the first waiting time T1 is set longer than the second waiting time T2 in the above embodiment, the first waiting time T1 may be set shorter than the second waiting time T2 depending on the operating conditions or traveling status of the vehicle 10. For example, when a shift to the P range is made after the vehicle is moved forward to a parking position with the D range in order to park the vehicle in a head-in direction, it is highly possible that the driver will makes a quick shift from the D range to the P range because the driver has an intention to park the vehicle and it is therefore highly possible that the duration Td after the automatic stop of the engine 30 in the D range will be shorter than the reference time Tth. In such a case, when a second waiting time T2 that provides a long waiting time is set as an engine restarting condition, restart of the engine 30 can be inhibited. For example, when the engine 30 is once automatically stopped in the P range and then the vehicle is started with the R range or the D range, it is highly possible that the duration Td after the automatic stop of the engine 30 in the P range will be equal to or longer than the reference time Tth because the driver at least once has an intention to park the vehicle when making a shift to the P range. In such a case, the engine 30 can be quickly restarted when a first waiting time T1 that provides a short waiting time is set as an engine restarting condition.

While the waiting time in the shift position after a shift position change is changed based on a determination on whether the duration Td for which automatic engine stop control is continued in the shift position before the shift position change has reached the reference time Tth in the above embodiments, the method for determining whether the driver operated the shift lever 96 with the intention of moving the vehicle 10 is not limited to determining whether the duration Td of automatic engine stop control has reached the reference time Tth. Either the first waiting time T1 or second waiting time T2 may be set based on an ON-operation of the parking brake 20, an operation of an auxiliary machine during automatic engine stop control, information on the position of the vehicle 10, vehicle speed, travel distance, the amount of depression of the brake or the like, or may be set based on the above operations and acquired information in combination.

While the reference time determination means 128 determines whether the duration Td for which automatic engine stop control is continued in the D range has reached the reference time Tth in the above embodiments, the reference time determination means 128 may determine the duration Td for which automatic engine stop control is continued in another range. For example, when a shift operation from the P range to the D range is made, it may be determined whether the duration Td for which automatic engine stop control is continued in the P range has reached the reference time Tth to change the waiting time in the R range.

While the automatic engine stop control in the N range is cancelled if the determination on whether a shift operation from the N range to the R range has been made within the waiting time T2 is negative in S4 and S5 in FIG. 5 in the above embodiments, for example, the determination in the N range may not be made. In other words, S7 may be executed without the determinations in S4 and S5 in FIG. 5 if the determination in S3 is positive. On the contrary, the controller for a vehicle may be a controller that does not have S7 to S11.

The automatic engine stop control that is described in the above embodiments is not limited to the one that is performed when the vehicle 10 is decelerated or stopped as the driver operating the brake and may be the one that is performed to stop the engine automatically to bring the vehicle into a free-running state when the vehicle is traveling at a low speed.

In addition, the above-mentioned embodiments may be implemented in combination according to established priorities, for example.

The above-mentioned embodiments are provided as illustrative embodiments, and the invention may be implemented in an aspect with various modifications and improvements based on the knowledge of those skilled in the art.

What is claimed is:

1. A controller for a vehicle, the vehicle including an engine and a transmission gear device, the controller comprising:
   an electronic control unit configured to:
   (i) stop the engine automatically when predetermined engine stopping conditions are fulfilled, the predetermined engine stopping conditions including fulfillment of a shift position condition of the transmission gear device,
   (ii) start the engine automatically when a predetermined waiting time has elapsed since a change in shift position,
   (iii) change the predetermined waiting time depending on a duration of an automatic stop of the engine, and
   (iv) increase the predetermined waiting time as the duration before the change in shift position is longer.

2. The controller according to claim 1,
   wherein the transmission gear device includes a plurality of shift positions, the plurality of shift positions including a first shift position and a second shift position,
   the shift position condition is fulfilled in the first shift position and the second shift position, and
   the electronic control unit is configured to change the predetermined waiting time when the shift position is changed to a third shift position that is located between the first shift position and the second shift position.

3. The controller according to claim 2,
   wherein the first shift position is a forward travel position,
   the second shift position is a parking position, and
   the third shift position is one of a neutral position and a reverse travel position.

4. The controller according to claim 2,
   wherein the electronic control unit is configured to change the predetermined waiting time when the shift position is changed to a fourth shift position that is located between the first shift position and the second shift position, and
   the electronic control unit is configured to set the predetermined waiting time in the third shift position and the predetermined waiting time in the fourth shift position to different lengths.

5. The controller according to claim 4,
   wherein the first shift position is a forward travel position,
   the second shift position is a parking position,
   the third shift position is one of a neutral position and a reverse travel position, and
   the fourth shift position is the other of the neutral position and the reverse travel position.

6. The controller according to claim 3,
   wherein the electronic control unit is configured to set the predetermined waiting time in the reverse travel position equal to or shorter than the predetermined waiting time in the neutral position.

7. The controller according to claim 5,
wherein the electronic control unit is configured to set the predetermined waiting time in the reverse travel position equal to or shorter than the predetermined waiting time in the neutral position.

8. A control method for a vehicle, the vehicle including an engine, a transmission gear device and an electronic control unit, the control method comprising:
   stopping, by the electronic control unit, the engine automatically when predetermined engine stopping conditions are fulfilled, the predetermined engine stopping conditions including fulfillment of a shift position condition of the transmission gear device,
   starting, by the electronic control unit, the engine automatically when a predetermined waiting time has elapsed since a change in shift position,
   changing, by the electronic control unit, the predetermined waiting time depending on a duration of an automatic stop of the engine, and
increasing, by the electronic control unit, the predetermined waiting time as the duration before the change in shift position is longer.

* * * * *